United States Patent [19]

Théret et al.

[11] Patent Number: 5,092,715

[45] Date of Patent: Mar. 3, 1992

[54] METHOD OF PIERCING A PLATE, OF ANY CONFIGURATION, WITH A VERY HIGH PERFORATION DENSITY AND PRODUCTS THUS OBTAINED

[75] Inventors: Patrice J. Théret, Le Bourget; Jean-Alain F. Jouan, Chaville, both of France

[73] Assignee: Societe de Construction des Avions Hurel-Duobis, Paris, France

[21] Appl. No.: 477,622

[22] Filed: Feb. 9, 1990

[30] Foreign Application Priority Data

Feb. 13, 1989 [FR] France .................. 89 01832

[51] Int. Cl.$^5$ .................................. B23B 35/00
[52] U.S. Cl. ........................ 408/1 R; 408/42
[58] Field of Search ............ 408/1 R, 42, 53, 700, 408/701, 704, 77

[56] References Cited

U.S. PATENT DOCUMENTS

| | | | |
|---|---|---|---|
| 1,854,053 | 4/1932 | Millspaugh | 408/1 R |
| 2,378,618 | 6/1945 | Burt . | |
| 2,625,846 | 1/1953 | Hess | 408/1 R |
| 3,093,416 | 6/1963 | Schmidt | 408/1 R |

FOREIGN PATENT DOCUMENTS

| | | | |
|---|---|---|---|
| 1273957 | 6/1968 | Fed. Rep. of Germany . | |
| 2535973 | 2/1977 | Fed. Rep. of Germany | 408/53 |
| 1017209 | 12/1952 | France | 408/42 |
| 2372672 | 6/1978 | France . | |
| 121809 | 6/1986 | Japan | 408/1 R |
| 657924 | 4/1979 | U.S.S.R. | 408/42 |
| 1174170 | 8/1985 | U.S.S.R. | 408/1 R |
| 279643 | 11/1927 | United Kingdom . | |
| 477773 | 1/1938 | United Kingdom | 408/42 |
| 1009685 | 11/1965 | United Kingdom . | |

OTHER PUBLICATIONS

Patent Abstracts of Japan, vol. 7, No. 179 (M-234) [1324] 08/09/83 by: Hitachi Seisakusho K.K.

*Primary Examiner*—Daniel W. Howell
*Attorney, Agent, or Firm*—Lorusso & Loud

[57] ABSTRACT

The invention is directed to a method of forming a large number of holes in a given area. A plurality of tools spaced along X and Y axes are used to form holes simultaneously, and the tools are successively moved in steps to drill more holes.

6 Claims, 4 Drawing Sheets

METHOD OF PIERCING A PLATE, OF ANY CONFIGURATION, WITH A VERY HIGH PERFORATION DENSITY AND PRODUCTS THUS OBTAINED

The present invention relates to a method of piercing a plate which, after machining, is to have a large number of small diameter holes with short between axis distances and representing a high perforation density, of the order of several tens of thousands of holes per square meter.

In general, the production of perforated plates of this type raises problems which are difficult to overcome. In fact, all the techniques used at the present time have revealed themselves to be either inconvenient to use technically, or expensive or are too slow for an industrial application.

Thus, the technique of piercing by punching theoretically allows a large number of perforations to be formed simultaneously but may cause deformation of the plate and so damage depending on the type of material; in addition, it is impossible to work on plates with curved portions.

When a piercing technique by drilling is used, because of the very small distance between the axes of the holes to be formed, a single piercing tool is used (drill or laser and water jet for plastic materials), which results in extremely long and unproductive working times.

A method of piercing has however been proposed (FR-A-2 372 672) using a battery of drills which, between each piercing operation, is raised and displaced by a step along a first line in a given direction, then at the end of the line is shifted by the same step in a direction forming an angle with said line and again actuated (piercing, raising, shifting by a step along a line parallel to the preceding one but in the opposite direction), and so on, until each drill has pierced a surface defined, on one side, by said first line and said direction forming an angle therewith. In this known method, the battery of tools has a surface space requirement substantially equal to the area of the plate to be perforated. This technique involves heavy tooling with respect to the surface to be worked.

Some piercing techniques, particularly for plates of materials having a resin coated fibre base have been recently proposed. These techniques consist in applying a pre-perforated mask on the plate and carrying out piercing by abrasion. Thus several tens of holes are formed simultaneously. However, this technique is slow, expensive, polluting and in particular does not allow the geometry and diameter of the holes formed to be controlled.

The present invention provides a new method of piercing a plate with a large perforation density, which overcomes the drawbacks of the known techniques by allowing perfect control of the geometry and of the diameter of the holes, great evenness in their spacing, absence of deforming forces and a possibility of piercing not only flat surfaces but also curved, convex or concave surfaces. This new method uses, like FR-A-2 372 672, a battery of tools but, in such a way, that the space requirement of the battery is in no wise related to the area of the plate to be perforated.

In this connection, the piercing method of the invention is characterized by the fact that:

the battery is formed of N tools for forming simultaneously a number N of perforations of diameter "e" spaced apart from each other by a distance "d" corresponding to the minimum between axis distance separating two adjacent tools taking into account the diameter "e" of the perforations to be formed, this distance "d" being greater than the step or spacing "p" separating two adjacent perforations, the N tools of the battery of tools being further disposed along the two axes of a plane with a space requirement D, over an elementary zone Z of the plate, a first sequence of step displacements of the battery of N tools is carried out, along the two axes (x and y) of the plane of zone Z, with a first step "p" which is a sub-multiple of the distance "d" separating two consecutive tools, then, with the elementary zone Z (=Lx.Ly) wholly perforated, the whole of the battery of N tools is subjected to a second sequence of displacements along one of the axes of the plane, by a second step (Lx+px) or (Ly+py) corresponding to the sum of the space requirement D of the battery of tools (along the axis of displacement of the second sequence), and of the distance "d" separating two consecutive tools along said axis.

Preferably, in the first sequence of tool displacement, their displacement follows a regular geometric pattern chosen for example from simple geometric figures.

The invention may apply to machining plates made from any material (metal, plastic or a resin coated synthetic fibre based materials). Furthermore, although it is adapted for working flat plates, it is advantageous for piercing plates having any surface with zones having convex, concave and complex radii of curvature.

Thus, for piercing in such curved zones, according to one aspect of the method of the invention, the number of active tools is reduced so that, with the plane formed by the battery of tools tangential to the curved zone, the axis of the perforation produced by the active tools situated the most peripherally is inclined by less than a maximum admissible value with respect to the normal to the curve at this point, the tools kept inactive being situated at the periphery of the battery of tools.

The method of the invention may be applied particularly advantageously in the case of manufacturing perforated composite material skins, i.e. having a resin coated synthetic fibre base, particularly the perforated skins used in the construction of acoustic panels for equipping the nacelles (pods) of aircraft engines.

It is known that these panels are formed of a perforated skin, supported by a material with cellular web, of the honeycomb type, whose opposite face is fixed to an unperforated skin, the whole forming absorbing chambers and being in general bonded together. The perforated skin has a multitude of small diameter holes whose between axis distances are calculated so as to obtain a ratio between the total area of the orifices and the total area of the perforated zone which provides the desired acoustic absorption effect. Usually, the perforation density is very high (several tens of thousands of holes per square meter).

In the case of manufacturing such a type of panel, the composite material skin can only be perforated after it has been previously shaped. The method of the invention is quite adapted to such a case for which it was moreover designed.

The means for implementing the method of the invention comprise the following main elements:

a battery of tools for removing material (drill, nozzle for water jet, abrasive jet, laser), a system of tool-holders having a configuration adapted to the type of perforations to be produced, a "digital control" type machine or equivalent, allowing positioning and displacement in space of the tool-holder assembly, software capable of controlling the assembly thus formed as a function of the geometry of the plate to be machined.

The method of the invention will now be described by way of non limitative example, with reference to the accompanying drawings in which.

Since the invention has been perfected within the field of sound-proof panels to be used in aircraft engines, the following description will refer, by way of example, to this particular case. It is however obvious that the invention could be used for other applications and, generally, for piercing plates of any shape having to have a high perforation density.

Figure 1:
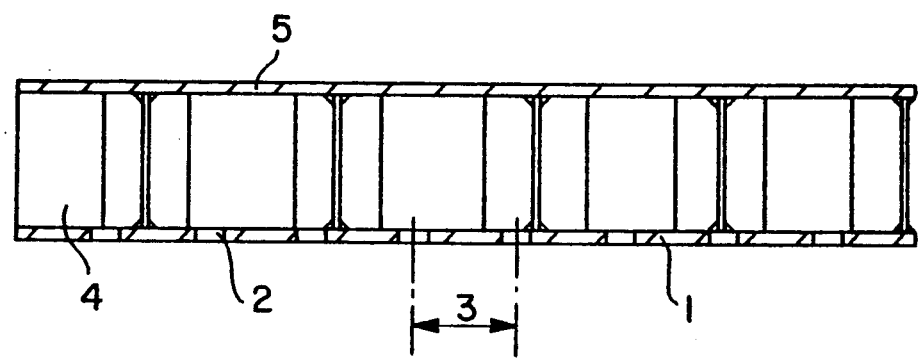
FIG. 1 is a section of an acoustic sound-proof panel, on an enlarged scale, for equipping parts of aircraft, particularly the engine nacelle.

Sound-proof panels are generally formed as shown in FIG. 1 and comprise:

a perforated skin 1 having a multitude of holes 2 of small diameter and with between axis distances 3 calculated so as to obtain a ratio between the orifice area and the total perforated area of the panel providing the desired acoustic absorption effect, a material with cellular web 4 of the honeycomb type, and an unperforated skin 5 closing the absorbing chambers formed between the perforated skin and material 4.

These three elements are fixed together for example by bonding.

Skins 1 and 5 may be formed either from a light metal alloy or from a material having resin coated fibre (carbon, glass, boron, aramide, . . . ) base.

In this case, skin 1 must necessarily be moulded to shape and then perforated.

It is more particularly to this latter case of composite skins that the method of the invention applies for forming simultaneous series of several perforations.

Figure 5:
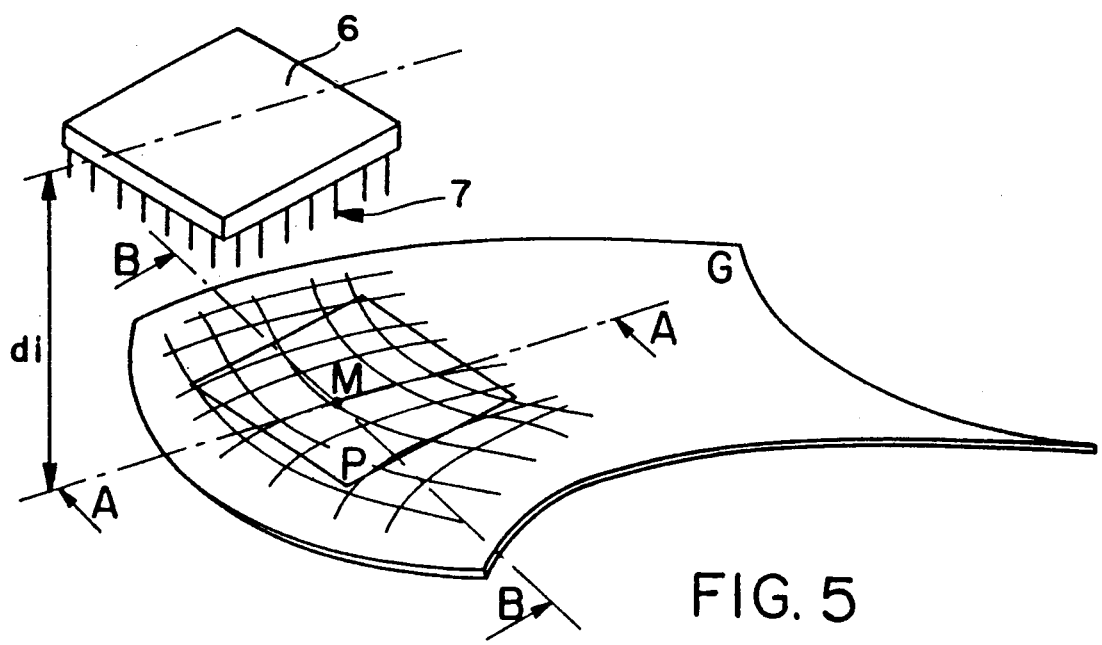
FIGS. 5, 6 and 7 are diagrams showing the use of the method for piercing a plate with a complex surface.
Figure 6:
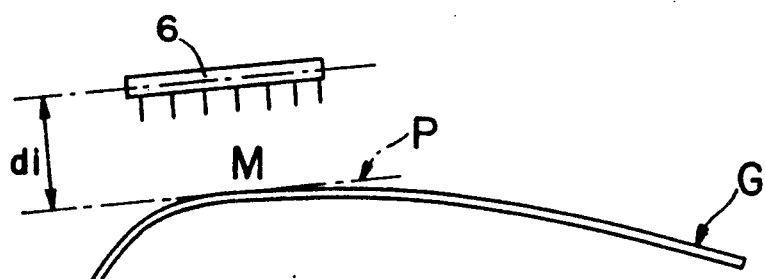
Figure 7:
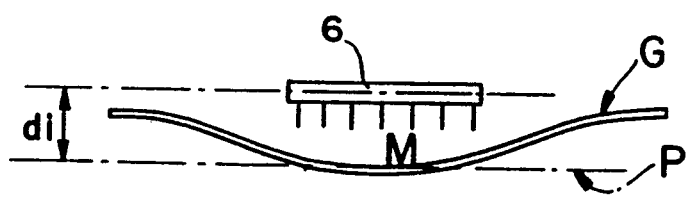

For implementing the method, a "digital control" type machine or equivalent is used allowing the displacement and positioning in space of a tool-holder assembly such as the one shown schematically at 6 in FIGS. 5 to 7, this assembly 6 carrying a battery of tools 7 for removing material (drill, water jet, abrasive jet, laser, . . . ) and having a configuration adapted to the perforations to be formed. The assembly is controlled by software.

In the preferred embodiment which will now be described, tools 7 are formed by drills.

As can be seen in FIGS. 5 to 7, the plate to be perforated is made from a previously shaped rigid composite material. Its surface (in the example shown a complex surface with double curvature) is defined at all points and its geometry is stored as transferable data-processing information which can be handled by the software controlling the machine implementing the method.

During the piercing operation, the position of the tool-holder assembly 6, which is in a displacement phase or is immobilized for carrying out such piercing, is taken into account by the software relatively to a reference frame related to the plate to be perforated (or to the tool which supports and positions it).

In the example shown, it is desired to form a panel whose perforated skin 1 must have the following characteristics:

$$\text{ratio} \frac{\text{total surface of the perforations}}{\text{surface processed}} = 8.42\%$$

diameter of the holes = 1.5 mm.

In such a case, by calculation a perforation density of 47,700 holes per $m^2$ is obtained. If the holes of two successive rows are disposed in a staggered arrangement, i.e. according to an elementary pattern which is an equilateral triangle, the distance between two consecutive holes or step "p" is then 4.92 mm.

To pierce such holes with drills, drill spindles of a diameter of 35 mm are used and two consecutive holes in the same row pierced simultaneously will therefore be spaced apart at a minimum of 8 "p", namely about 4.92 mm $\times$ 8 = 39.36 mm.

Figure 2:
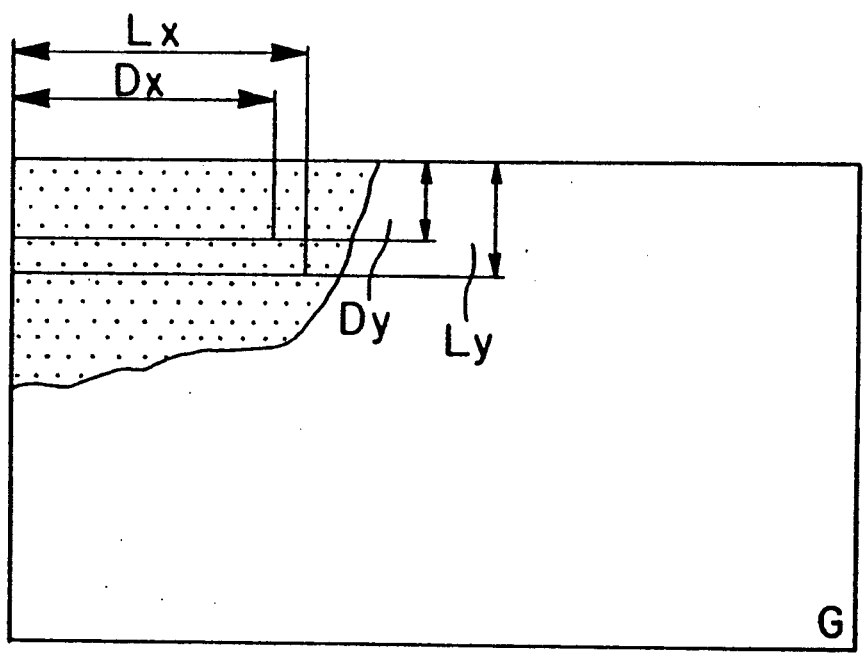
FIGS. 2, 3 and 4 are diagrams for explaining the method of the invention.

To explain the method simply, let us consider that it is desired to pierce the whole of a flat surface G such as the one shown in FIG. 2. A battery of six drills F (two rows of three drills) defines a tool area requirement Dx-Dy along the two axes of the plane.

Figure 3:
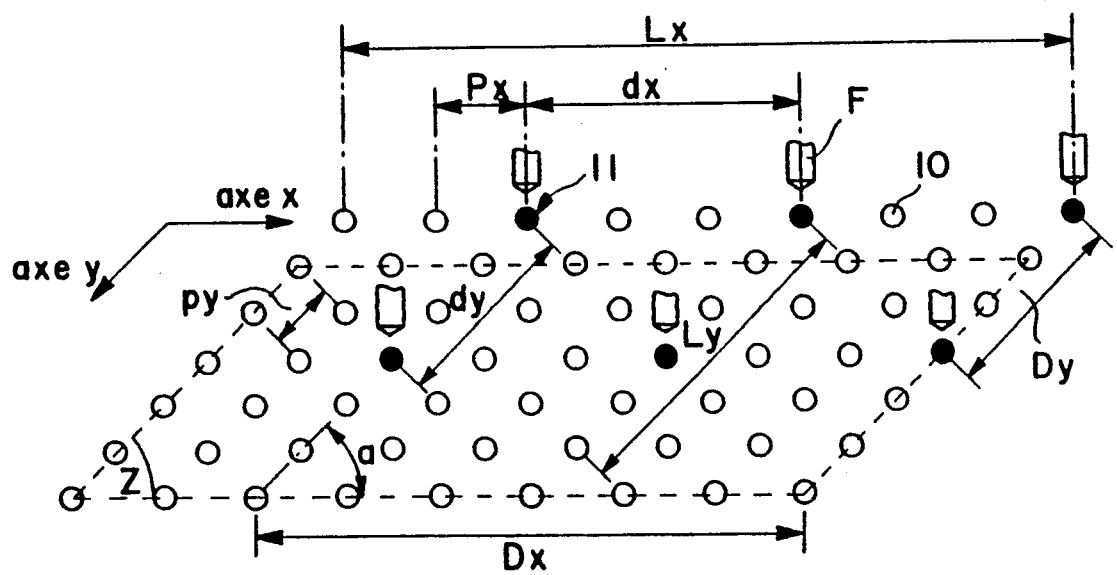

In FIG. 3, an elementary zone Z (FIG. 2) to be perforated has been shown on an enlarged scale. The white circles 10 represent the whole of the perforations to be made in this zone Z. The six black circles 11 are perforations made by drills F at time To.

The meanings of the other letters in FIGS. 2 and 3 are the following:

px: spacing between two successive perforations along axis x of the plane, py: between two successive perforations along the axis y of the plane, dx and dy: spacing between two consecutive drills F, respectively along axes x and y of the plane.

To pierce the whole of zone Z, a first sequence of successive step displacements of the battery of tools is carried out with step sizes px and py. In other words, after holes 11 are perforated, the whole of the battery of tools is raised, it is translated along axis x by a distance px and, at time $t_1$, a second series of holes is perforated. Then, after raising the tools, they are translated by a distance py along the axis y and so on, until all the holes 10 between the holes 11 pierced initially have been perforated. In the case of FIG. 3, nx or ny is equal to 3, as nx = dx/px and ny = dy/py.

The set of displacements in this first sequence covers then the elementary zone Z of dimension Lx by Ly and of area Z = Lx.Ly.sin a (a being the angle formed by the axes x and y of the plane in which the tools move).

If the number of tools along axes x and y are respectively Nx and Ny, then:

Lx = (Nx.nx − 1) px

Ly = (Ny.ny − 1) py

In FIG. 3, for the sake of clarity, only two perforations 10 to be formed between two consecutive drills F have been shown but in the case of the example recalled above with a spacing of 8 "p" between two drills, it will be understood that the number of holes 10 to be formed would be 7 and that the number of displacements of the tools to pierce a row of holes would also be 7.

The tool-holder plate 6, oriented or translated in any direction, is situated at the time of its displacement at a constant distance "di" (FIGS. 5 to 7) with respect to the workpiece to be machined, the plane of the plate being constantly parallel to the plane P tangential at M to surface G of the workpiece which may be convex (FIG. 6 through A—A of FIG. 5) or concave (FIG. 7 through B—B of FIG. 5). Thus, any useless movement of plate 6 is avoided and so any loss of time between two successive perforations. The previous dimensioning of the tool-holder plate will be made depending on the geometry of the workpieces to be machined so that the maximum number of tools is used for a zone, to be perforated in a single pass, which is the largest possible.

The tools are fixed to the plate so as to correspond to an elementary perforation pattern and to the space requirement of each tool, the spacing between two tools being equal to a multiple of the distance separating two consecutive holes.

Figure 4:
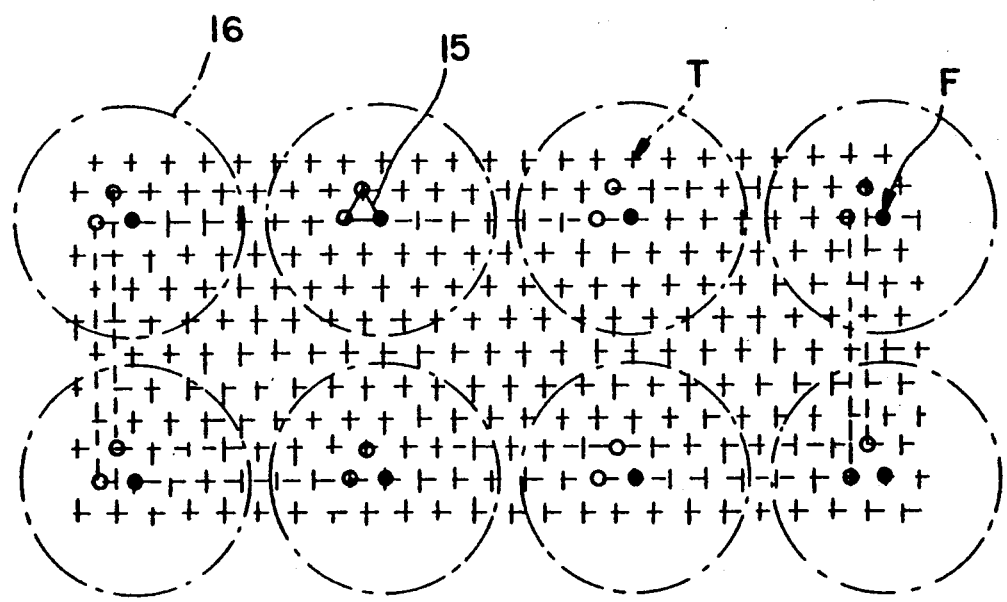

The elementary perforation pattern may be any one but simple geometric figures will be preferably chosen such as isoceles triangle, rectangle, hexagon. Thus, in FIG. 4, perforations T have been shown formed according to an elementary triangular pattern 15, the tools or drills being shown schematically at F and the drill spindles with broken lines at 16.

It will be noted that the method allows simultaneous perforations to be formed in a variable number by making some of the tools of the plate active or not, which is necessary particularly when working on short curves such as shown in FIGS. 6 and 7. In fact, in any zone of workpiece G, it is possible to define a mean radius of curvature by calculation. The software of the machine then compares the value of the radius of curvature in this zone with the number of tools potentially active on the plate. The choice of the number of active tools considering the geometry in question is made automatically, the maximum number of tools being of course desirable for reasons of productivity.

Figure 8:
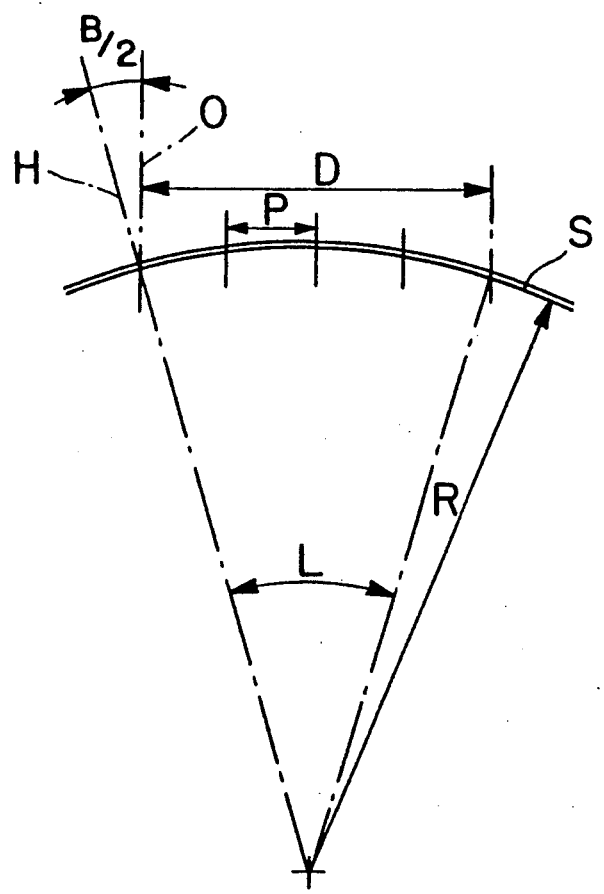
FIG. 8 is a diagram showing how the perforations are formed in a curved zone of the plate.

FIG. 8 is a diagram showing how the number of tools is determined.

In the curved zone S which it is desired to pierce (which may be a surface with several radii of curvature), the smallest radius of curvature R is chosen. Given the angle:

$$B/2$$

the maximum admissible (for example less than 10°) by which the axis O of a hole may deviate from the normal H to the surface at the position of the hole, the angle L of the zone on which piercing can be carried out is determined by the machine.

The total space requirement D of the tools, i.e. the distance by which the two endmost active tools must be separated, is equal to $D = 2R \times \tan(B/2)$. Since $D = (Nn - 1)p$, N being the number of tools and "p" the distance between the axes of the holes to be perforated, the optimum number N' of tools to be used will be less than or equal to $(D/p + 1)/n$. "n" being the ratio between the distance separating two consecutive tools and the elementary step.

We claim:

1. Method of piercing a plate, which is to have, after machining, a perforation density of the order of several tens of thousands of holes per square meter, said method using a battery of tools acting simultaneously, which battery of tools is movable step by step, said method being characterized in that it comprises:

providing a battery of N tools, in a original position, for forming simultaneously a number N of perforations of diameter e, the N tools of the battery being disposed in a plane defined by first and second axes x and y, the N tools of the battery being further disposed such that adjacent tools along a direction parallel to the x-axis are spaced apart from each other by a distance dx corresponding to a minimum distance between axes of two adjacent tools in the direction parallel to the x-axis, taking into account the diameter e of the perforations to be formed, the distance dx further being a multiple of a step px, px being a distance between two adjacent perforations after the plate is completely pierced, in the direction parallel to the x-axis, the N tools of the battery also being disposed that that adjacent tools along a direction parallel to the y-axis are spaced apart from each other by a distance dy, corresponding to a minimum distance between axes of two adjacent tools in the direction parallel to the y-axis, taking into account the diameter e of the perforations to be formed, the distance dy further being a multiple of a step py, py being a distance between two adjacent perforations after the plate is completely pierced, in the direction parallel to the y-axis, the N tools of the battery of tools being further disposed to cover an area Dx by Dy, where Dx is along the x-axis and is a multiple of the distance dx, and where Dy is along the y-axis and is a multiple of the distance dy piercing the plate while the battery of N tools is in the original position, moving the battery of N tools from the original position over an elementary zone of the plate, the elementary zone having an area of Lx by Ly, Lx being along the the x-axis, and Ly being along the y-axis, the movement of the battery of N tools being according to a first sequence of px step displacements in the direction parallel to the x-axis and py step displacements in the direction parallel to the y-axis piercing the plate after each px and py step displacements, so as to wholly perforate the elementary zone, moving the battery of N tools according to a second sequence of displacements, along one of the x-axis and y-axis, by a second step, the second step being such that the distance between the original position and a position after the second step is equal to (Lx+px) for a second step along the x-axis, and (Ly+py) for a second step along the y-axis, the second step further being such that the distance between the original position and the position after the second step is equal to (Dx+dx) for a step along the x-axis, and equal to (Dy+dy) for a step along the y-axis, piercing the plate after each second step, and repeating the first and second sequences, where the position of the battery of N tools after a given second step is the original position for a subsequent first and second sequence, until the plate is wholly perforated.

2. Method according to claim 1, characterized in that in the first sequence of tool displacement, the displacement follows a pattern chosen from among simple geometric figures.

3. Method according to claim 1 applied to a plate having curved zones, characterized in that, for piercing in the curved zones, the number of active tools is reduced so that, with the plane formed by the battery of tools tangential to the curved zone, the axis of the perforation produced by the active tools situated the most peripherally is inclined by less than a maximum admissible value with respect to the normal (H) to the curve at this point, the tools kept inactive being situated to the periphery of the battery of tools.

4. Method according to claim 1, characterized in that positioning of the battery of tools with respect to the plate to be perforated, as well as its displacements along the defined series of the two sequences of displacement, are controlled by a computer program.

5. Method according to claim 1, characterized in that the method is applied to the perforation of plates made from materials having a resin coated synthetic fibre base, the perforations being provided by removing material.

6. Method according to claim 1 comprising: forming the plate to be perforated from a composite material having a resin coated fibre base, and fixing the perforated plate to a cellular web, the face of which is covered with an unperforated skin to form a sandwich acoustic panel.

* * * * *